UNITED STATES PATENT OFFICE 2,662,832

PROCESS OF PRODUCING AN ELECTROPHOTOGRAPHIC PLATE

Arthur E. Middleton and Otavio J. Mengali, Columbus, Ohio, assignors, by mesne assignments, to The Haloid Company, Rochester, N. Y., a corporation of New York No Drawing. Application April 8, 1950,
Serial No. 154,879

8 Claims. (Cl. 117—64)

This invention relates to an electrophotographic plate and a method of producing the same. In particular, the invention relates to a plate and method of producing a plate having an adherent coating containing vitreous selenium, such that when an electric charge is placed on the coating, the coating will act as an electrical insulator to the charge in the dark and as an electrical conductor to the charge on exposure to light.

A base plate coated with selenium in the vitreous, amorphous, or even alpha monoclinic crystalline form, where it is believed that selenium rings or chain molecules exist with a minimum of metallic binding between the molecules, will hold an electrostatic charge in the dark and dissipate it rapidly on exposure to light. Such forms of selenium are photoconductive insulating material and are useful for electrophotographic plates of the type described in Carlson Patent No. 2,297,691.

Although neither the amorphous nor vitreous forms of selenium show crystalline patterns on X-ray analysis, they are believed to be somewhat different in that one comprises very finely-divided particles while the other consists of a supercooled liquid. For the purposes of this invention vitreous selenium will be considered the same as amorphous selenium. It is also contemplated that the selenium coatings of this invention may be amorphous and/or vitreous selenium which contain some alpha monoclinic selenium. Although the alpha monoclinic form cannot always be detected, it may very well be present, and since it is also a photoconductive insulating material itself, it does not adversely affect the properties of the electrophotographic plate.

Hexagonal or metallic selenium does not possess sufficiently high resistance in the dark to enable its use for electrophotographic plates. If a plate is entirely coated with a coating or film of this form of selenium it will not retain an electrostatic charge. Insulating vitreous selenium films on X-ray analysis have revealed the presence of very minor amounts of hexagonal selenium, but the amount of hexagonal selenium is so small and thoroughly dispersed that it does not affect the electrophotographic properties of the resulting coated plate. It is also reasonable to assume that even where X-rays will not detect hexagonal selenium crystals, they may still exist in the vitreous film in the form of widely dispersed crystallites so that no conducting paths are formed. The invention therefore contemplates that small quantities of isolated conductive crystals may be present in the photoconductive insulating layers or coatings.

Attempts to produce vitreous selenium films by hot-pressing have resulted in repeated failure. This is believed caused by the conversion, at some stage in the process, of a large part or substantially all of the bulk of the coating or film into the hexagonal metallic form including the surface layers or by the production of contaminating compounds or impurities and orientation of the molecules in the surface layers of the film, resulting in a plate which will not hold an electrostatic charge and consequently is not useful for electrophotographic purposes. But for the undesirable results heretofore obtained, hot-pressing is an admirable method of producing electrophotographic plates since the process involves a minimum amount of equipment and number of steps and since only relatively low pressures and temperatures need be utilized therein to readily cause selenium to flow and form a film on a base material.

It is, therefore, an object of this invention to afford a method of overcoming the difficulties alluded to above and to provide a method utilizing hot-pressing which results in a selenium film that is photoconducting and insulating.

Another object of this invention is to provide a method for producing vitreous selenium coated plates in which the film is substantially free of hexagonal selenium and in which the surface layers thereof are not only substantially free of hexagonal selenium but also free of contamination and molecular orientation.

It has now been found that a vitreous selenium photoconducting insulating film can be produced on a base plate if a minor amount of a crystallization inhibitor is added to the selenium and the resulting selenium composition pressed followed by removal of only the outer surface layers of the film without depositing or forming conducting compounds.

In general to produce an electrophotographic plate by practicing this invention it has been found necessary to prepare a homogeneous dry or molten mixture of selenium and inhibiting material, for example, sulfur. The mixture is next poured or spread on a base plate and is then pressed at moderate pressures and temperatures for a short period of time, sufficient to cause the mixture to flow and form a film on the base plate. After pressing the coated plate is quenched (optionally) and finally polished in a manner such as to remove only the outer surface layers of the film. This last step consists in polishing under water at room temperature with progressively finer grits or powders and after removal of orientated surface molecules and conducting compounds finishing the surface with a liquid polish to remove grit and any remaining contaminants without production of any conducting compounds. The resulting plate can then be used directly in the electrophotographic process to make excellent electrophotographic images.

Prior to pressing, the selenium can have any form, either crystalline or vitreous, since it will be in the molten or plastic state when pressed to form a thin film. It should be free of impurities such as copper, iron, lead and bismuth which appear to adversely affect its ability to hold electrostatic charges, that is, by forming conducting paths in the film or promoting the formation of conducting hexagonal selenium so that electrostatic charges leak off rapidly in the dark and electrostatic deposition of powder or other finely-divided material cannot be obtained. Preferably, there should be used amorphous selenium available in pellet form $\frac{1}{16}''$ to $\frac{1}{8}''$ size under the name "A. R. Q." (ammonia reduced in quartz from $SeO_2$), for this grade of selenium is essentially pure containing less than about 20 parts per million of impurities. If purified, other grades of selenium, i. e., "D. D. Q." (double distilled in quartz) and "C. C. R." (commercial grade) can likewise be employed in the process disclosed herein. To purify these grades of selenium, they are first freed of copper, iron, lead, and bismuth by distillation. The selenium is next heated to about 250° C., slightly above its melting point, and while molten is then dropped through a shot tower (or in the laboratory by means of an eye dropper) into water to form pellets. The pellets are subsequently treated with petroleum ether to remove water and allowed to air-dry. If desired, the purified selenium can be remelted and cast in boats to form sticks. It can also be reduced in size by grinding or micropulverizing to facilitate melting and mixing with the sulfur.

The inhibitor when added to the selenium prevents the formation of appreciable or substantial amounts of hexagonal selenium in the selenium film during pressing so that essentially a vitreous selenium film is produced having crystallization-inhibited properties. Sulfur has been found to be the best inhibitor for this purpose and not only prevents formation of hexagonal selenium but apparently aids development of the vitreous film per se. Any form of sulfur can be used since it is fused to a molten mixture or solution with the selenium prior to pressing. The commercial grades of sulfur are acceptable, although it is desirable to use the "C. P.," chemically pure, grades whenever possible to reduce possible contamination which would result in reduction of the photo-conductive and insulating properties of the film.

The selenium and sulfur in either stick, pellet or powder forms are heated and mixed together in a pot or other container until a homogeneous molten mass is produced, care being taken to prevent too long contact with hot atmospheric gases which might form or introduce harmful impurities, i. e., oxides of selenium or sulfur, etc., in the melt and adversely affect the electrophotographic properties of the resulting film. The container should also be cleaned before use and be made of a material which will not adversely affect the melt. Container materials that have been found satisfactory for the purposes of this invention are chromium and stainless steel.

The means for heating the container is not critical. A gas flame or electric heating elements can be used. The selenium-sulfur mix is heated in the container to its melting point. The melting point of pure selenium is 220° C. Additions of sulfur lower the melting point of the mixture so that with 0.1% sulfur the melting point is about 218° C. and as the sulfur concentration is increased to 10% the melting point is lowered to about 212° C. It is preferred that the temperature shall not greatly exceed the melting point of the mixture, and in any event that it shall not appreciably exceed 220° C. to avoid sublimation of sulfur as well as possible formation of oxides of selenium and sulfur. Moreover, since the sulfur reduces the viscosity of the selenium it is not necessary to resort to high temperatures. In place of melting the solid selenium-sulfur mix at one time, one component can be melted and the other added thereto, for example, the selenium can first be melted and the desired amount of solid sulfur dissolved therein, or, if desirable, the sulfur can be first melted and the required amount of selenium slowly added and dissolved therein until the correct ratio of dissolved components is achieved. The latter method enables the employment of lower temperatures, although both melting procedures are somewhat longer than melting the solid mix at one time.

The amount of sulfur in the melt and resulting vitreous film necessary to produce coatings having photoconductive insulating properties will vary from about 0.1 to about 10% by weight, the balance being selenium. From 1 to 3% sulfur, balance selenium, is preferred. Less than about 0.1% sulfur does not sufficiently inhibit the formation of hexagonal selenium in the bulk of the film, resulting in a coating that does not have photoconductive insulating properties; nor does it reduce the viscosity of the selenium so that it can be readily poured onto the base plate and will easily flow under heat and pressure. On the other hand over about 10% sulfur in the melt renders the composition too fluid to be readily handled and, although sulfur in some cases has some photoconductive insulating properties, in the present case an excess above 10% sulfur, materially reduces the photoconductive properties of the hot-pressed film. Hence, between 0.1 and 10% sulfur in the sulfur-selenium mix is essential in providing sufficient viscosity, lowered melting point, and retardation of growth of hexagonal selenium, in order to produce a pressed vitreous, homogeneous film containing sulfur and selenium and possessing photoconductive insulating properties.

After melting and mixing the selenium-sulfur mix, it is poured onto a base plate. Heating of the base plate helps to keep the mixture in plastic condition during the pressing operation and it is preferred, therefore, that the base plate be preheated to a temperature between 50 and 200° C. If the selenium-sulfur mixture is cooled rapidly from molten condition, however, it remains plastic and flowable for a short time even at room temperature (21° C.) so it is sometimes permissible to dispense with heating of the base plate and pressure platens.

A conductive base plate is usually required for electrophotographic plates and metal forms the most suitable material. However, a high conductivity is not required and almost any structurally satisfactory material which is more conductive than the pressed selenium-sulfur layer can be used. Materials having electrical resistivities of up to $10^{10}$ ohm-cm. are generally satisfactory for the base plates of this invention, although it is more desirable to use materials having an electrical resistivity of less than about $10^5$ ohm-cm. Conductive base plates which will withstand temperatures up to about 220° C. and pressures up to about 150 p. s. i. without cracking, distortion, deterioration, or flowing are preferred. The results obtained with plates having a thickness of from $\frac{1}{16}''$ to .005'' are substantially the same. Relatively thin plates are preferred to permit more rapid cooling after hot pressing of the coating. Any gross surface irregularities, i. e., burrs, tool marks, are removed from the base plate by grinding or polishing although it is unnecessary to polish the plate until it has mirror-like surface. The plate surface is cleaned before coating with the selenium-sulfur melt in order to remove grease, dirt, and other impurities which might prevent firm adherence of the coating to the base plate. This is readily accomplished by washing the plate with any suitable alkali cleaner or with a hydrocarbon solvent such as benzene, followed by rinsing and drying. Suitable base plate materials are aluminum, glass, aluminum-coated glass, stainless steel, nickel, chromium, and steel, which do not react with the selenium or sulfur to produce undesirable compounds such as oxides nor promote the formation of hexagonal selenium and thereby adversely affect the electrophotographic qualities of the film. Other materials having electrical resistances in the described range and capable of withstanding the conditions imposed during formation of the film on pressing can also be employed as base plates for the selenium-sulfur coating.

The base plate carrying the molten or plastic selenium-sulfur is placed under a pressure platen, and preferably between flat, parallel platens on a press to press out the molten selenium-sulfur mix and cause it to flow evenly over the base plate. The platens are cleaned and smoothed in the same manner as described above with respect to the base plate, in order that the surface of the resulting film will be substantially flat, even, and contain no pinholes nor thick areas. It is also requisite that the platens be made of a material which will not strongly adhere to the pressed coating nor cause formation of hexagonal selenium nor introduce impurities into the outer surface layers which cannot be removed on polishing. It has been found that platens of mica, stainless steel, or chromium, or containing coatings of these materials, meet the aforementioned requirements. The platens are preferably heated to a temperature between 50 and 200° C. Heating may be accomplished by any convenient means such as a gas flame, electrical coils or heater elements or electrical induction heating.

The pressure exerted will depend to some extent on the area, thickness, temperature and composition used, and the uniformity of distribution of the composition prior to pressing. With the heated platens exerting a pressure of from 50 to 150 p. s. i. for from 5 to 10 minutes the selenium-sulfur mix will easily flow over a base plate several inches wide to form a thin film. Smaller areas can be pressed in less time. The thickness of the film is a function of the temperature of the platens, the pressure applied, and the time. Within the above limits the coatings produced will vary from 0.0001 to 0.01 inch. A coating of about 0.0001 inch is about the lowest practical limit, for below this point the coating becomes so thin that pinholes are apt to occur and a continuous film is not produced. Extremely thin films also do not always accept or hold a sufficiently high electrostatic charge to produce electrophotographic images of acceptable density. Thicknesses above 0.01 inch do not apparently result in plates of improved electrophotographic properties, and hence thicknesses greater than about 0.01 inch offer no particular advantages. For ease in processing and savings in materials, it is preferred to produce hot-pressed vitreous films ranging in thickness from 0.0005 to 0.002 inch.

On removal of the pressed coated plate from the platens it is cooled below 50° C. and preferably to room temperature. Air cooling is satisfactory. Some improvement in the electrophotographic properties of the plate is obtained, however, if it is rapidly quenched in water at room temperature from the pressed temperature. Quenching probably aids to a slight extent in preventing the residual tendency of any hexagonal selenium in the bulk of the film to form during the cooling process by passing rapidly through the crystallization point, or it supplements to a slight degree the function of the sulfur. It may be noted in this connection that quenching hot-pressed pure selenium, not selenium-sulfur mixtures, does not prevent the formation of hexagonal selenium or help in producing a photoconductive insulating film, and in fact it appears to have no effect whatsoever on the pure selenium hot-pressed film. Hot-pressing pure selenium produces hexagonal selenium in the bulk and on the surface, so quenching after hot-pressing is futile.

After pressing, cooling and solidification of the pressed film, the plate carrying the solidified coating of vitreous selenium-sulfur composition is treated in order to remove the outer surface layers to render the surface of the coating susceptible to electrophotography. Although sulfur prevents the formation of hexagonal selenium in the bulk of the selenium-sulfur film, the surface condition of the hot-pressed plate as removed from the press is such that it will not satisfactorily accept or retain an electrostatic charge which will permit the attraction of powder on other finely-divided material to develop an image. This property of the hot-pressed plate as removed from the press and cooled is believed to be due to two things: first, that the surface molecules of the pressed film are orientated during pressing so that they form conducting paths on the surface of the film; second, that the material of the platen next to the film surface, while not necessarily promoting the formation of hexagonal selenium, either reacts with the selenium or sulfur to form objectionable conducting compounds or disperses somewhat into the outer layers to form conducting paths for electric charges. These conducting paths are believed to extend in a lateral direction over the outer surfaces of the film and discharge the plate in this manner rather than by conducting the electrical charges through the body of the film.

Many methods can be used for removing the outer molecular layers of the film provided they do not produce hexagonal selenium, nor deposit or develop conducting or other undesirable compounds in the film, nor result in pinholes or roughness which would destroy definition or clarity of the images, nor remove more than a small proportion of the thickness of the film. For pressed films in the preferred range of 0.0005 to 0.002 inch thick it is preferable that not over one or two ten-thousandths of an inch of the film be removed.

Metallographic polishing procedures under water have been found to be particularly desirable for the purpose of removing the undesired outer surface layer without injury or dangerous overheating of the remaining film. Such polishing also produces a very flat and smooth surface which is also desirable in order to obtain good definition and eliminate background. The polishing operation is continued with progressively finer size grits until the surface layer has been removed. The remaining film has a volume resistivity through the layer of about $10^{10}$ ohm-cm. in the dark. In addition, the resistance between point probes (.001 square inch area) located one-half inch apart on the film surface was about $10^{10}$ ohms. Such a film will hold an electrostatic charge as required in the electrophotographic process. During polishing the temperature of the film is not allowed to exceed 50° C. to prevent formation of any hexagonal selenium from the vitreous selenium. This is readily achieved if the polishing operation is conducted under water which is held at room temperature or below. In place of water a cold air stream can be passed over the work during polishing.

In carrying out the preferred method the film is first polished under water with fine size grit metallographic paper in one direction, next polished with a finer size grit metallographic paper in a direction perpendicular to the first, with a number of passes equal to or greater than the number of passes made in the first operation. The scratches produced by the grit in the above operation are next removed with a very fine polishing compound, such as levigated alumina or magnesium oxide, and finally, to remove any remaining grit particles and contaminating compounds and to finish the surface so that it is glossy, flat and smooth, the surface of the film is polished with a liquid dispersion of a very fine inert polishing material such as iron oxide or chromium oxide. The preferred material is "C. R. O." liquid metallographic polish, believed to be essentially an ammoniacal aqueous suspension of an abrasive material. After polishing, the film is smooth and bright and glossy, and when used in the electrophotographic process, excellent powder images and prints can be made without spots or background.

Certain modifications within the scope of this invention can be made in the above procedure. For example, the selenium-sulfur melt need not be poured in molten form onto the base plate, but it can be quickly quenched or cooled so that the homogeneous molten 0.1 to 10% sulfur, balance selenium, mixture is converted into the amorphous or vitreous form. It can also be cast in boats to form sticks or dropped into water to form pellets. Prior to hot-pressing, the base plate can be substantially covered with this cast vitreous selenium-sulfur mix by rubbing the sticks on the surface of the plate (warmed or heated in this instance), or the selenium-sulfur pellets or sticks can be ground up into chunks or micropulverized and the chunks or powders spread on the base plate. These modifications enable the amorphous or vitreous selenium-sulfur mix to be prepared some time in advance which facilitate production by eliminating the need of preparing it immediately prior to hot-pressing.

The following example will serve to illustrate the invention with more particularity to those skilled in the art.

Three parts by weight of C. P. sulfur and 97 parts by weight of "A. R. Q." selenium (ammonia refined in quartz) were heated to 216° C. in a chromium plated container until all of the selenium and sulfur had melted. The molten mass was next thoroughly stirred until the melt was homogeneous. It was then poured onto a heated (100° C.) clean and polished 0.05 by 11 by 16 inch aluminum base plate which was placed between chromium platens heated electrically to a temperature of 180° C. by means of coils in the platens and pressed at a pressure of 100 p. s. i. for 7 minutes. At the end of the pressing operation, the coated plate was removed from the platens and immediately quenched in water at room temperature. The coating film on the cooled plate was very adherent and had a uniform thickness, but its surface exhibited a swirl pattern of gray hexagonal selenium. The electrical resistance between point probes one-half inch apart on the surface was about $10^4$ ohms and the plate would not hold an electrical charge. The plate was again placed in water at room temperature and polished in one direction with 240 grit metallographic paper, followed by polishing in a direction perpendicular to the first with 600 grit metallographic paper. The scratches produced by polishing with metallographic paper were then removed by polishing the coating with levigated alumina for fifteen minutes and finally polished with "C. R. O." liquid metallographic polish for another fifteen minutes. The film or coating on the resulting plate was glossy and it had an electrical resistance between point probes one-half inch apart of about $10^{10}$ ohms and also a volume electrical resistivity of about $10^{10}$ ohm-cm. It would hold electrostatic charges and had a very small dark decay rate. When used in the electrophotographic process, the plate produced excellent prints.

It is evident from the foregoing that an improved method of successfully producing photoconductive insulating layers composed predominantly of selenium, for use as electrophotographic plates and the like, has been described. It is readily seen that only the addition of sulfur to the selenium will not result in successful plates since this does not avoid the production of conducting layers in the surface of the film; while polishing to remove the surface layers of pressed pure selenium films does not produce satisfactory electrophotographic plates, since, without sulfur, hexagonal selenium is produced. However, by combining the steps of adding sulfur to selenium, hot-pressing, and polishing, as described herein, it is possible to obtain an electrophotographic plate having excellent properties. The process requires no difficult techniques and is operable at relatively low temperatures and pressures, and it is, thus, readily adaptable to mass production techniques for the quick and economical production of electrophotographic plates.

While flat, rigid base plates or flexible foils which can be coated flat between platens are most readily adapted to the present process it is also contemplated that coatings can be applied to other bases, such as cylinders, half-cylinders and the like by suitable pressing platens or devices.

Since certain changes in carrying out the above process and certain modifications in the composition which are embodied in the invention can be made without departing from the invention, it is intended that all matter contained in the above description shall be interpreted as illustrative and not in a limiting sense.

What is claimed is:

1. The method of producing an electrophotographic element having a vitreous photoconductive insulating film containing selenium, which comprises pressing onto a conductive base a heat-plasticized composition containing 0.1 to 10 percent by weight of sulfur as an inhibitor the amount of inhibitor thus being sufficient to prevent formation of hexagonal selenium, and the balance selenium to form a coating on said base and finally removing the outer surface layer of said coating.

2. In the method of producing an electrophotographic plate consisting of a base plate and a vitreous coating of sulfur and the balance selenium, the steps consisting of preparing a homogeneous melt of from 0.1 to 10% by weight of sulfur and the balance selenium, placing a portion of said melt on a base having a resistivity of less than $10^{10}$ ohms-cm. and pressing said melt onto said base at a temperature of from 50 to 200° C. under a pressure of from 50 to 150 p. s. i. to form a thin coating on said plate, quenching said coated plate, and finally polishing said coated plate to remove the outer surface layer of said coating.

3. The method of making an electrophotographic element and the like, which comprises producing a fused composition of 0.1 to 10% sulfur and the balance selenium, depositing said composition on the surface of a conductive supporting base and pressing said composition out into a uniform coating on said base while said composition is in a flowable condition, and subsequently removing the surface layer of said coating.

4. The method of making an electrophotographic plate which comprises depositing a molten composition of 0.1 to 10% sulfur and the balance selenium on a clean conductive base plate held at a temperature between 50 and 200° C., pressing said composition out into a film having a thickness between 0.0001 and 0.01 inch on said base plate by applying pressure while said composition is in a flowable condition, cooling said base plate and pressed film to room temperature and then polishing away a surface layer of the solidified film to leave an electrophotographic plate comprising a conductive base carrying an adherent film of photoconductive insulating material.

5. The method as claimed in claim 4 in which said polishing is effected without raising the temperature of said film substantially above room temperature.

6. The method as claimed in claim 4 in which said polishing is done under water at room temperature.

7. The method as claimed in claim 4 in which said base plate and pressed film are quenched in water at room temperature after pressing.

8. The method as claimed in claim 4 in which the pressure applied to said composition during pressing into a film reaches between 50 and 150 pounds per square inch.

ARTHUR E. MIDDLETON.
OTAVIO J. MENGALI.

References Cited in the file of this patent

UNITED STATES PATENTS

| Number | Name | Date |
| --- | --- | --- |
| 1,920,093 | Marra | July 25, 1933 |
| 2,020,476 | Scott | Nov. 12, 1935 |
| 2,168,462 | Williams | Aug. 8, 1939 |